Figure 1:
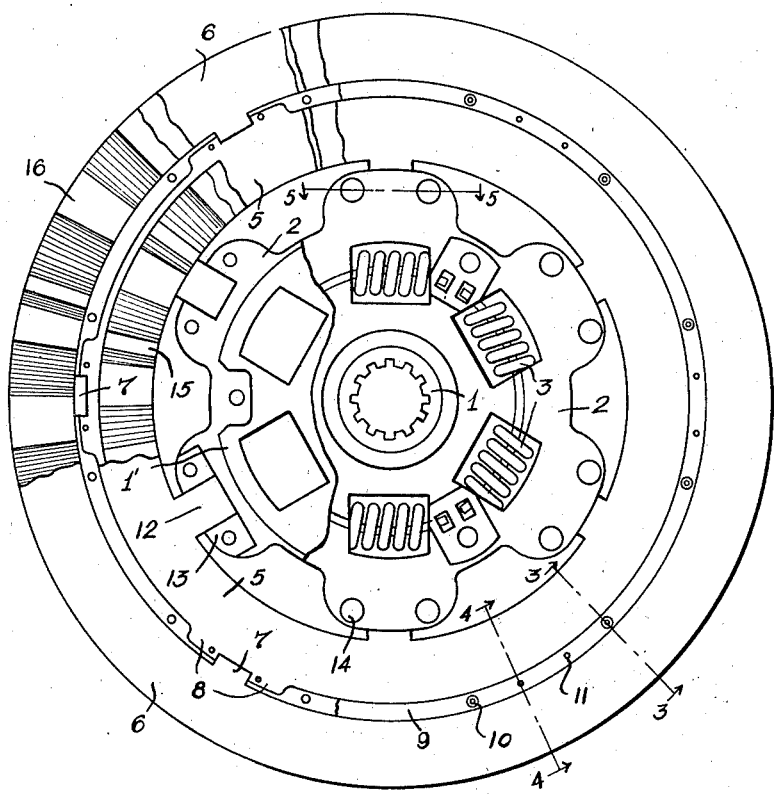

Feb. 20, 1940.   J. V. O. PALM ET AL   2,190,994
CLUTCH PLATE
Filed March 16, 1938

INVENTOR.
John V. O. Palm and
Henry W. Luetkemeyer

BY  Bay, Oberlin & Bay
ATTORNEYS.

Patented Feb. 20, 1940

2,190,994

UNITED STATES PATENT OFFICE 2,190,994

CLUTCH PLATE

John V. O. Palm, Cleveland Heights, and Henry W. Luetkemeyer, Euclid, Ohio, assignors to The Cleveland Graphite Bronze Company, Cleveland, Ohio, a corporation of Ohio Application March 16, 1938, Serial No. 196,247

15 Claims. (Cl. 192—107)

The present invention relates to that element of a clutch assembly, commonly known as a clutch plate, which is engaged between the surfaces of the driving members such as the flywheel and pressure plate.

It is the general object and nature of our invention to provide such a clutch plate construction which is light in weight, thereby reducing the spinning inertia of the driven clutch element, which is relatively strong and durable; and finally, which is capable of absorbing heat generated upon frictional engagement without producing a warping and distortion of the plate.

A further object of the invention is to provide cushioning means for absorbing engagement pressure applied to the clutch plate in order to enhance smooth and even engagement of the clutch parts.

Since a clutch plate is generally in the form of a disc whose outer peripheral, or "friction facing" portion which constitutes the contact or engagement surface of the plate, is subjected to repeated heating and cooling due to the heat of friction generated therein, there is a tendency for a differential contraction and expansion action to be set up between the inner and outer parts (in a radial direction) of such heated portion. It has been found that the point of highest heat generation in a clutch plate friction facing occurs intermediate the inner and outer circumferential boundaries thereof. Since the amount of contraction and expansion of a material, particularly a metal, is directly proportional to the temperature, this undesired expansion and contraction effect set up in a clutch plate will correspondingly be found at a point intermediate the inner and outer boundaries of the friction facing portion. It is further indicated that during cooling of the clutch plate certain portions (with reference to a radial direction) cool more rapidly than others, and as a result the hotter portions are upset or permanently deformed, so that when the entire plate has reached an even low temperature, there results an excessive distortion in the form of warping or dishing of the clutch plate.

Therefore, in order to overcome such disadvantage and to eliminate its result, namely, the warping and dishing of the clutch plate, our invention provides a continuous expansion joint in the friction facing portion of a clutch plate, located intermediate the inner and outer boundaries thereof.

Our invention also includes the cushioning spring means comprising corrugated annular spring elements mounted between opposed friction facing portions, such spring elements having their spring pressure resistance so proportioned with respect to the area of the facing rings or sections which they support that there results a uniform spring pressure resistance per unit area throughout the engagement portion of the clutch plate.

To the accomplishment of the foregoing and related ends, said invention, then, consists of the means hereinafter fully described and particularly pointed out in the claims.

The annexed drawing and the following description set forth in detail certain structure embodying the invention, such disclosed means constituting, however, but one of various structural forms in which the principle of the invention may be used.

Figure 2:
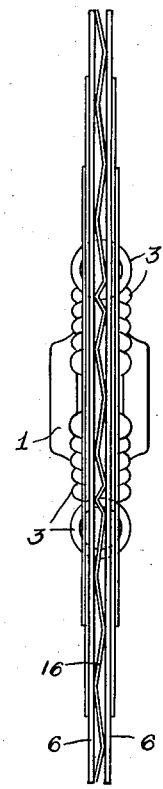
Figure 3:
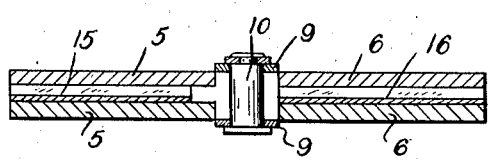
Figure 4:
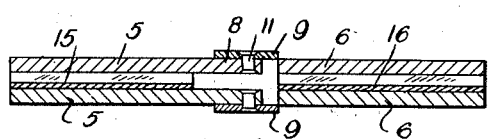
Figure 5:
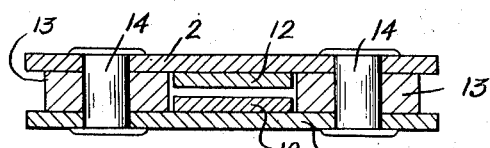

In said annexed drawing:

Fig. 1 is a plan view with portions broken away of a clutch plate embodying the principle of our invention; Fig. 2 is an end elevational view of the clutch plate shown in Fig. 1; Fig. 3 is an enlarged sectional view of the friction facing portion of the clutch plate and taken substantially along line 3—3 of Fig. 1; Fig. 4 is a similarly enlarged sectional view taken along line 4—4 of Fig. 1; and Fig. 5 is an enlarged sectional view taken along line 5—5 of Fig. 1.

Now referring more particularly to the drawing, the clutch plate shown therein comprises a splined hub portion 1 upon which there is mounted the body portion of the plate consisting of the center plates 2. The center plates 2 are resiliently mounted with respect to the hub flange 1' through the medium of the cushion springs 3. The friction facing portion of the clutch plate which is adapted to make contact with the driving members (not shown) of the clutch assembly, such as the pressure plate and flywheel, comprises the concentric annular rings 5 and 6. These annular rings 5 and 6 may be composed of sheet steel or solid metal similar to the material used in other parts of the clutch plate. In such instance the material having a higher coefficient of friction, such as non-metallic material having asbestos fiber compound, or sintered metallic material, is mounted upon and carried by the flywheel and pressure plate engaging surfaces. These rings 5 and 6 may also be fabricated of a sintered metallic friction material, or of a composite metallic structure consisting of a layer of steel with the sintered metallic material bonded to the exterior surface thereof.

The friction facing rings 5 and 6 are spaced from each other around the majority of their adjacent peripheries and are circumferentially interlocked at intervals by means of the tongues 7 extending into slots or recesses provided by the shoulders 8 on the rings 5. The tongues 7 and their receiving slots thus form an interlocking joint between the rings 5 and 6 which will permit the latter to expand and contract in a radial direction with respect to each other, but at the same time will interlock them circumferentially so that driving power is transmitted from one to the other.

Cover rings 9 overlap the space or joint between the rings 5 and 6 and are held in place by means of the large rivets 10 extending entirely through the thickness of the plate and the small rivets 11 extending only through the adjacent shoulders 8 on the rings 5. It will thus be seen that the plates 5 and 6 are enabled to expand or contract both centrifugally and centripetally or in a radial direction with respect to each other by reason of the expansion joint between them which in effect is a continuous, circumferential expansion joint. Thus, any tendency of the outer ring 6, forming a portion or section of the friction engaging surface of the plate to grow smaller or larger, as the case may be, with respect to the corresponding tendency of the ring 5 forming another section of the friction engaging surface, is entirely compensated for.

The inner friction ring 5 is connected to the body portion or center plates 2 of the clutch plate by means of the centrally projecting tongues 12 engaged between the spacer blocks 13. As will best be seen in Fig. 5, the spacer blocks 13 and the center plates 2 are fastened together by means of the rivets 14. Thus the inner friction ring 5 is also free to move in a radial direction with respect to the body of the clutch plate.

The facing rings 5 and 6 are resiliently or compressibly mounted in an axial direction with respect to each other by means of the corrugated spring rings 15 and 16, which are somewhat in the nature of a Belleville type spring. Since the engagement surface area of the inner friction ring 5 is smaller than the engagement surface area of the outer friction ring 6 (both of them being of substantially equal width but of different diameters), the sizes of the spring rings 15 and 16 are so proportioned that the spring resistance pressure per unit area of both the rings 5 and 6 will be substantially equal. Thus, it will be seen that the inner spring ring 15 is of less width than the outer spring ring 16, and of correspondingly less total spring pressure, so that the friction rings which they subtend, being of proportionately smaller surface area, will require a substantially equal force per unit area to be compressed together or in an axial direction. By reason of this uniformity or balancing of the cushioning forces between the facing rings 5 and 6, the wear due to frictional engagement is uniform throughout the life of the clutch plate.

Other equivalent means of proportioning the spring pressure resistance of the spring rings 15 and 16 may also be utilized, such as by varying the number of corrugations, varying the angle of the corrugations, or changing the cross-sectional thickness of the rings.

Other modes of applying the principle of our invention may be employed instead of the one explained, change being made as regards the structure herein disclosed, provided the means stated by any of the following claims or the equivalent of such stated means be employed.

We therefore particularly point out and distinctly claim as our invention:

1. In a clutch plate, a friction facing portion having a continuous circumferential expansion joint intermediate its inner and outer peripheries, and means secured to said facing portion and entirely covering said joint.

2. In a clutch plate, a friction facing portion divided into concentric annular sections spaced radially from each other, and means for interlocking said sections against circumferential, but not radial, movement, and a cover ring covering the space between said sections.

3. In a clutch plate, a friction facing portion divided into concentric annular sections spaced radially from each other to a substantial extent, and radially extending tongues and slots on said sections interlocking one to the other.

4. In a clutch plate, a friction facing portion and a body portion, said friction facing portion extending radially beyond said body portion and being divided into concentric annular sections spaced radially from each other, means for interlocking said sections to each other against circumferential, but not radial, movement, and means for similarly locking the innermost of said sections to said body portion, and a cover ring covering the space between said sections.

5. In a clutch plate, a friction facing portion and a body portion, said friction facing portion extending radially beyond said body portion and being divided into concentric annular sections spaced radially from each other to a substantial extent, and radially extending tongues and slots on said sections and on said body portion interlocking one to the other.

6. In a clutch plate, a friction facing portion divided into concentric annular sections spaced radially from each other, means for interlocking said sections against circumferential, but not radial, movement, and a cover ring secured to said interlocking means and covering the space between said sections.

7. In a clutch plate, a friction facing portion divided into concentric annular sections spaced radially from each other, radially extending tongues on one section and slots on the other section for interlocking one section to the other, and a cover ring secured to said slotted section adjacent the slot, said ring covering the space between said sections.

8. In a clutch plate, friction facing portions on each side of said plate, each of said friction facing portions being divided into concentric annular sections, with the sections of one facing portion opposite those of the other facing portion, means mounted between each pair of opposed sections and individual to such pair, and adapted to urge the sections of such pair in an axial direction away from each other.

9. In a clutch plate, friction facing portions on each side of said plate, each of said friction facing portions being divided into concentric annular sections, with the sections of one facing portion opposite those of the other facing portion, and spring means mounted between each pair of opposed sections and individual to such pair.

10. In a clutch plate, friction facing portions on each side of said plate, each of said friction facing portions being divided into concentric annular sections, with the sections of one facing portion opposite those of the other facing portion, and spring means mounted between each pair of opposed sections and individual to such pair, the spring resistance of each of said spring means being so proportioned that the spring resistance pressure per unit area imparted to each pair of opposed sections is substantially uniform.

11. In a clutch plate, friction facing portions on each side of said plate, each of said friction facing portions being divided into concentric annular sections, with the sections of one facing portion opposite those of the other facing portion, and corrugated spring rings mounted between each pair of opposed sections and individual to such pair, the spring resistance of each of said rings being so proportioned that the spring resistance pressure per unit area imparted to one pair of opposed sections will be substantially the same as that imparted to the other pair of opposed sections.

12. In a clutch plate, friction facing portions on each side of said plate, each of said friction facing portions being divided into concentric annular sections, with the sections of one facing portion opposite those of the other facing portion, spring means mounted between each pair of opposed sections and individual to such pair, the spring resistance of each of said spring means being so proportioned that the spring resistance pressure per unit area imparted to one pair of opposed sections will be substantially the same as that imparted to the other pair of opposed sections, and means for interlocking said sections against circumferential, but not radial, movement.

13. In a clutch plate, friction facing portions on each side of said plate, each of said friction facing portions being divided into concentric annular sections, with the sections of one facing portion opposite those of the other facing portion, corrugated spring rings mounted between each pair of opposed sections and individual to such pair, the spring resistance of each of said rings being so proportioned that the spring resistance pressure per unit area imparted to one pair of opposed sections will be substantially the same as that imparted to the other pair of opposed sections, and means for interlocking said sections against circumferential, but not radial, movement.

14. In a clutch plate, friction facing portions on each side of said plate, each of said friction facing portions being divided into concentric annular sections, with the sections of one facing portion opposite those of the other facing portion, and corrugated spring rings of unequal width mounted between each pair of opposed sections and individual to such pair, the widest of said rings being mounted between the outermost sections.

15. In a clutch plate, friction facing portions on each side of said plate, each of said friction facing portions being divided into concentric annular sections, with the sections of one facing portion opposite those of the other facing portion, and spring means mounted between each pair of opposed sections, and individual to such pair, said spring means being in the form of corrugated spring rings.

JOHN V. O. PALM.
HENRY W. LUETKEMEYER.